United States Patent
Lee

(10) Patent No.: US 11,920,623 B2
(45) Date of Patent: Mar. 5, 2024

(54) FASTENER ASSEMBLY

(71) Applicant: Illinois Tool Works Inc., Glenview, IL (US)

(72) Inventor: Danbee Lee, Incheon (KR)

(73) Assignee: Illinois Tool Works Inc., Glenview, IL (US)

(*) Notice: Subject to any disclaimer, the term of this patent is extended or adjusted under 35 U.S.C. 154(b) by 532 days.

(21) Appl. No.: 17/257,987

(22) PCT Filed: Jun. 27, 2019

(86) PCT No.: PCT/US2019/039418
§ 371 (c)(1),
(2) Date: Jan. 5, 2021

(87) PCT Pub. No.: WO2020/009886
PCT Pub. Date: Jan. 9, 2020

(65) Prior Publication Data
US 2021/0231152 A1    Jul. 29, 2021

(30) Foreign Application Priority Data
Jul. 6, 2018  (KR) .................. 10-2018-0078647

(51) Int. Cl.
*F16B 19/10* (2006.01)
*F16B 21/07* (2006.01)
*B60R 13/02* (2006.01)
*B60R 13/04* (2006.01)

(52) U.S. Cl.
CPC ........ *F16B 19/1081* (2013.01); *F16B 21/073* (2013.01); *B60R 13/0206* (2013.01); *B60R 13/04* (2013.01); *F16B 19/10* (2013.01)

(58) Field of Classification Search
CPC .... F16B 5/065; F16B 13/004; F16B 13/0858; F16B 13/122; F16B 13/124; F16B 13/128; F16B 19/10; F16B 19/1081; F16B 19/109; F16B 21/073; F16B 21/086; B60R 13/0206; B60R 13/04
USPC ...... 411/15, 18, 32–33, 508–510; 16/2.1–2.2
See application file for complete search history.

(56) References Cited

U.S. PATENT DOCUMENTS

| | | | |
|---|---|---|---|
| 4,033,223 A | 7/1977 | Marks | |
| 4,804,303 A | 2/1989 | Statkus | |
| 6,769,849 B2 * | 8/2004 | Yoneoka | ............. F16B 19/1081 411/41 |
| 7,736,107 B2 * | 6/2010 | Okada | ................. F16B 19/1081 411/41 |

(Continued)

FOREIGN PATENT DOCUMENTS

| | | |
|---|---|---|
| DE | 29918363 U1 | 1/2000 |
| DE | 102007016484 A1 | 10/2008 |

(Continued)

OTHER PUBLICATIONS

International Search Report and Written Report for PCT/US2019/039418, dated Sep. 20, 2019 (11 pages).

*Primary Examiner* — Roberta S Delisle
(74) *Attorney, Agent, or Firm* — Quarles & Brady LLP

(57) ABSTRACT

A fastener assembly of the present disclosure includes a grommet including a head having a through-hole formed therein and at least one leg extending downward from the head; and a pin configured with a head and a shaft inserted into the grommet. The grommet and the pin are integrally formed by a connection tip.

10 Claims, 6 Drawing Sheets

(56) References Cited

U.S. PATENT DOCUMENTS

| | | | | |
|---|---|---|---|---|
| 7,862,272 B2* | 1/2011 | Nakajima | F16B 21/084 | 411/48 |
| 8,956,095 B2* | 2/2015 | Sato | F16B 19/1081 | 24/458 |
| 9,016,993 B2* | 4/2015 | Watanabe | F16B 19/1081 | 411/45 |
| 2004/0247410 A1* | 12/2004 | Anscher | F16B 19/1081 | 411/45 |
| 2005/0019130 A1* | 1/2005 | Kanie | F16B 19/1081 | 411/45 |
| 2005/0220561 A1* | 10/2005 | Okada | F16B 19/1081 | 411/41 |
| 2011/0170982 A1* | 7/2011 | Watanabe | F16B 19/1081 | 411/360 |
| 2012/0057948 A1* | 3/2012 | Jeon | F16B 19/1081 | 411/357 |
| 2014/0259564 A1* | 9/2014 | Gromes | F16B 19/1081 | 24/453 |
| 2014/0310945 A1* | 10/2014 | Kanie | F16B 19/1081 | 411/502 |
| 2014/0341674 A1* | 11/2014 | Hirano | F16B 19/1081 | 411/80.1 |
| 2016/0138629 A1 | 5/2016 | Flynn et al. | | |

FOREIGN PATENT DOCUMENTS

| | | |
|---|---|---|
| JP | H08284928 A | 11/1996 |
| JP | 2003172327 A | 6/2003 |
| JP | 2003247518 A | 9/2003 |
| JP | 2005351313 A | 12/2005 |
| JP | 2006029427 A | 2/2006 |
| JP | 2007170460 A | 7/2007 |
| KR | 19990031857 U | 7/1999 |
| KR | 20080103646 A | 11/2008 |
| KR | 20110101004 A | 9/2011 |
| KR | 20150046848 A | 5/2015 |
| KR | 20170043505 A | 4/2017 |
| WO | 2011/136030 A1 | 11/2011 |

* cited by examiner

FASTENER ASSEMBLY

CROSS REFERENCE TO RELATED APPLICATIONS

This present application represents the United States National Stage of International Application No. PCT/US2019/039418, filed Jun. 27, 2019, is based on, claims priority to and incorporates by reference in its entirety Korean patent application number 10-2018-0078647 filed on Jul. 6, 2018.

FIELD OF THE DISCLOSURE

The present disclosure relates to a fastener assembly, and more particularly to a fastener assembly obtained by configuring a pin and a grommet in an integrated form.

BACKGROUND

In general, interior and exterior parts, for example, bumpers, wheel guards, tailgate trim, cowl top covers, or the like are mounted on automobile panels. A fastener assembly is used to mount the various interior and exterior parts.

The fastener assembly is used to fix the interior and exterior parts of various automobiles (hereinafter referred to as "object to be fixed"). For example, a fastener assembly may be used to securely connect one or more objects to be fixed.

In particular, cover panels such as trunk trim, wheel housing, mudguards, bumpers, undercovers, and the like can be fixed to the door frame or panel of the automobile through one or more fastener assemblies.

Certain known fastener assemblies use multiple separate components to fix objects together (e.g., nuts and bolts, blind rivets, etc.).

However, the respective manufacturing costs of the separate components increase the overall production cost of these known fasteners assemblies.

Also, in some instances, unattractive internal components of the known fastener assemblies are exposed, thus decreasing overall marketability of the assembled automobile.

Accordingly, there is a demand for the development of a more complex and improved type of fastener assembly.

SUMMARY

A fastener assembly of the present disclosure includes a grommet and a pin. The grommet includes a head having a through-hole formed therein and at least one leg extending downwardly from the head. The pin is configured with a shaft and a head. The head is inserted into the grommet. The grommet and the pin are integrally formed by a connection tip.

In some embodiments, the connection tip is severed when a force is applied in a direction in which the pin is inserted into the grommet.

In some embodiments, the connection tip is formed between the through-hole and an insertion tip formed on the shaft.

In some embodiments, four connection tips are disposed radially at equal intervals around the through-hole.

In some embodiments, the connection tip is formed during injection molding of the pin and the grommet.

In some embodiments, the head of the pin has a diameter equal to or greater than a diameter of the head of the grommet.

In some embodiments, a gap is formed between the head of the pin and the head of the grommet when the pin is inserted into the grommet.

In some embodiments, an upper end of the head of the grommet is formed into an arc shape, the lower end of the head of the pin is formed to be flat, and the gap is formed between the grommet and the pin.

In some embodiments, a fixing protrusion is provided on the lower surface of the head of the grommet.

In some embodiments, a key is formed on the grommet or pin, and a key groove is formed on an object to be installed via the grommet.

DETAILED DESCRIPTION

Hereinafter, preferred embodiments of the present disclosure will be described in detail with reference to the accompanying drawings.

The present disclosure has been devised in order to solve the various problems of the prior art described above, and an object of the present disclosure is to provide a fastener assembly in which a pin and a grommet are integrally formed and which is capable of fixing an object to be fixed by a single motion in which a grommet and a pin are inserted into the object to be fixed.

In addition, another object of the present disclosure is to provide a fastener assembly which is formed such that the diameter of the pin head is equal to or greater than the diameter of the grommet head to improve the sense of high-quality and the marketability.

Figure 1:
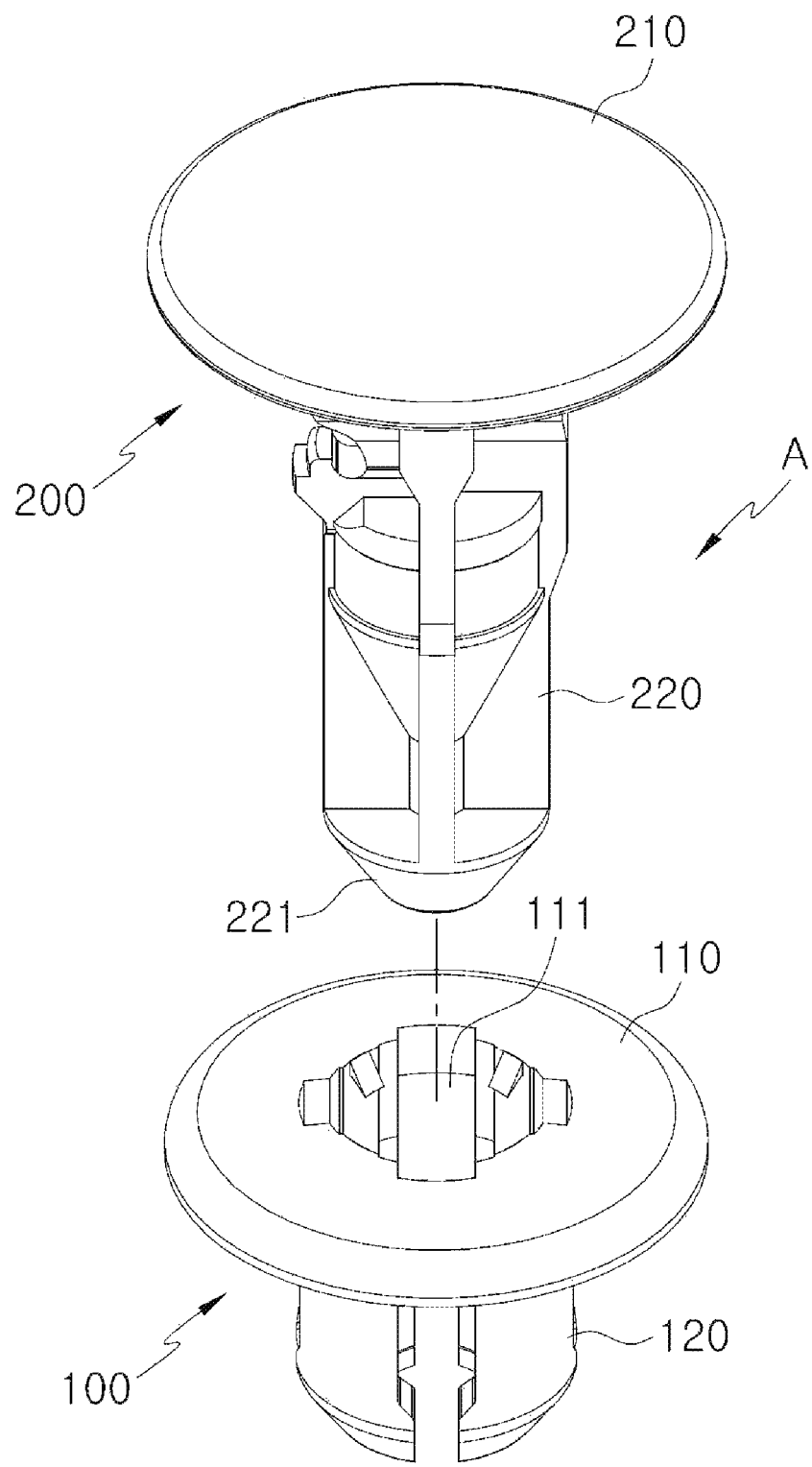
FIG. 1 is a perspective view illustrating an exploded view of a fastener assembly according to the present disclosure.
Figure 2:
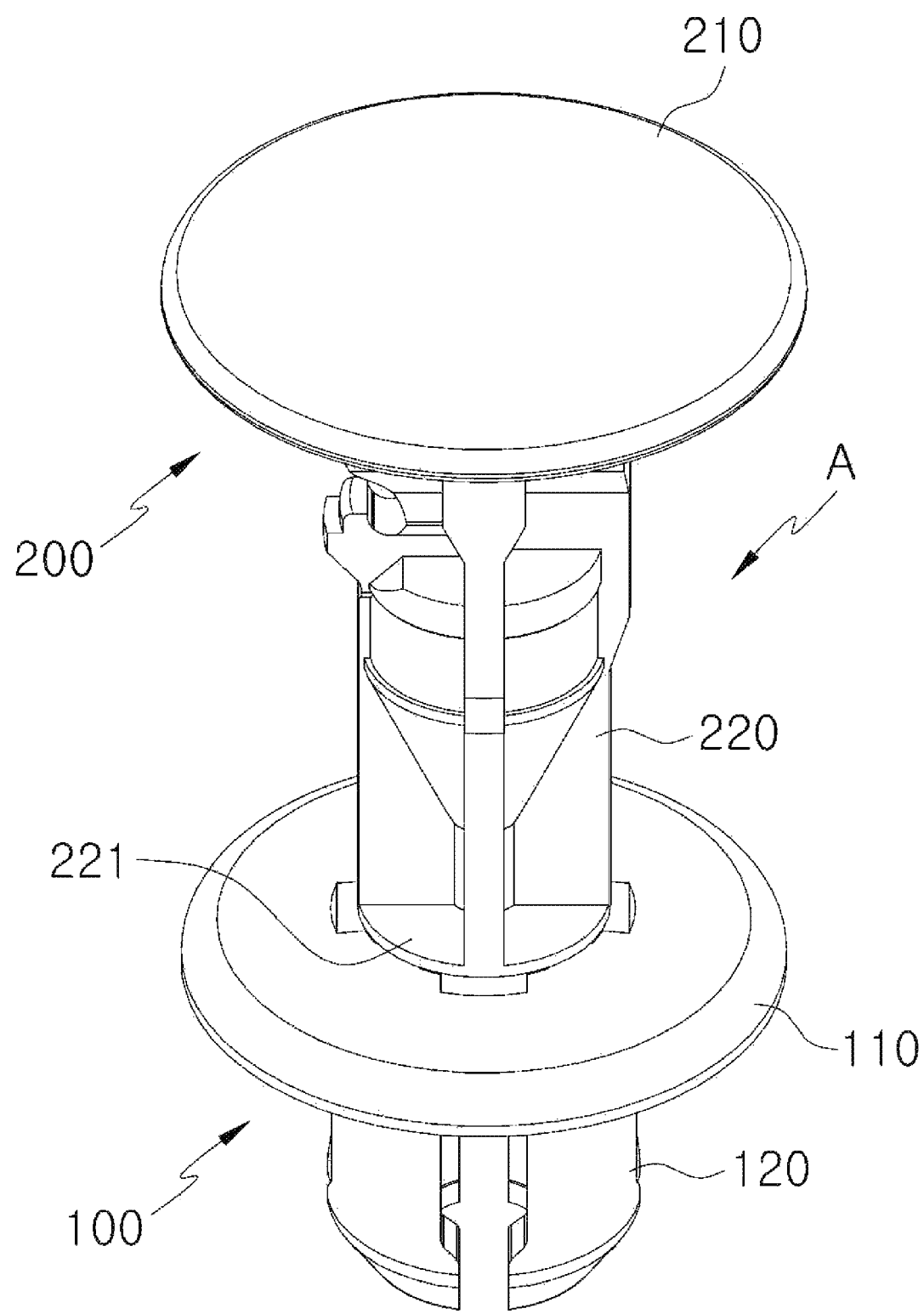
FIG. 2 is a perspective view illustrating a fastener assembly according to the present disclosure.
Figure 3:
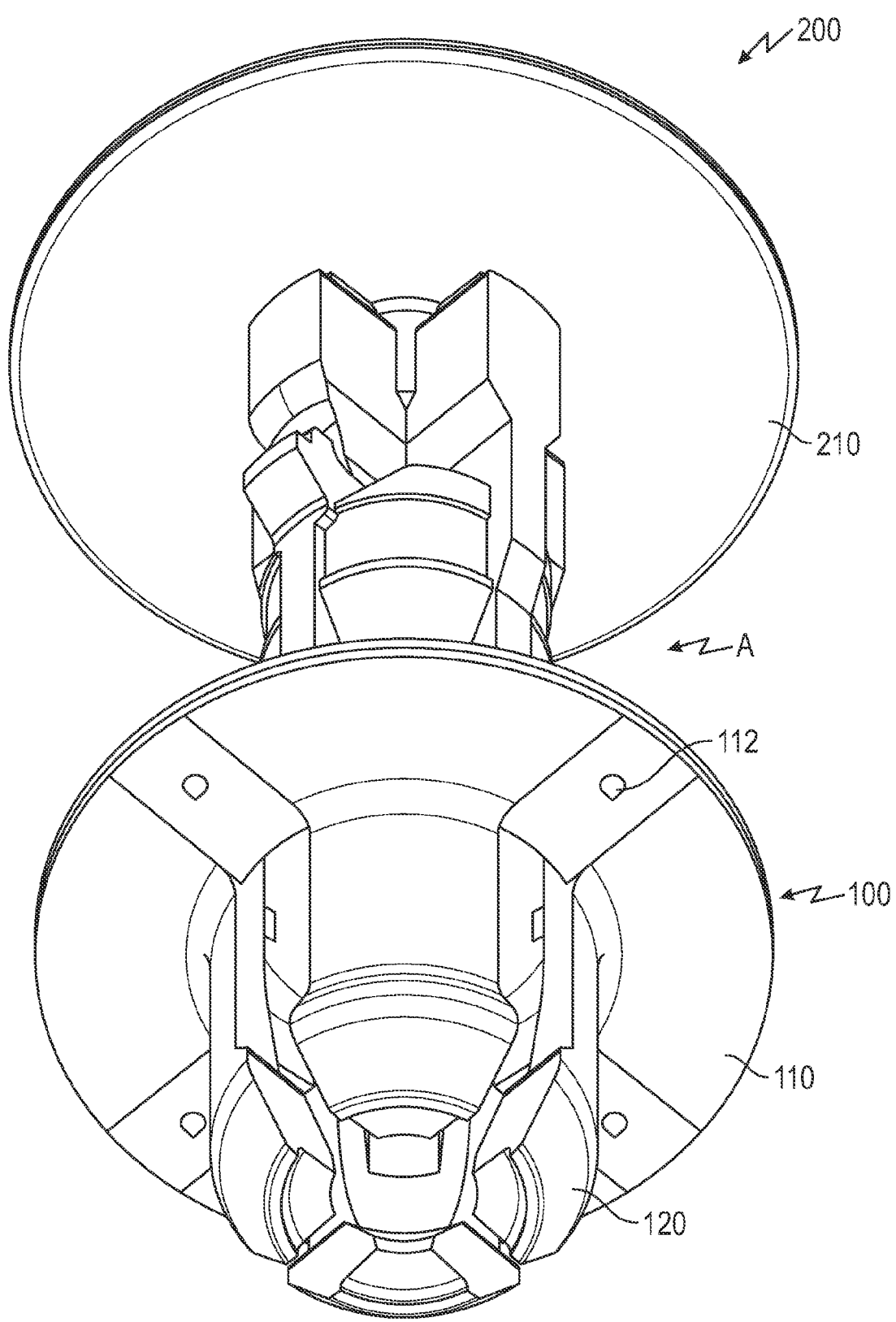
FIG. 3 is a perspective view illustrating a bottom surface of FIG. 2.
Figure 4:
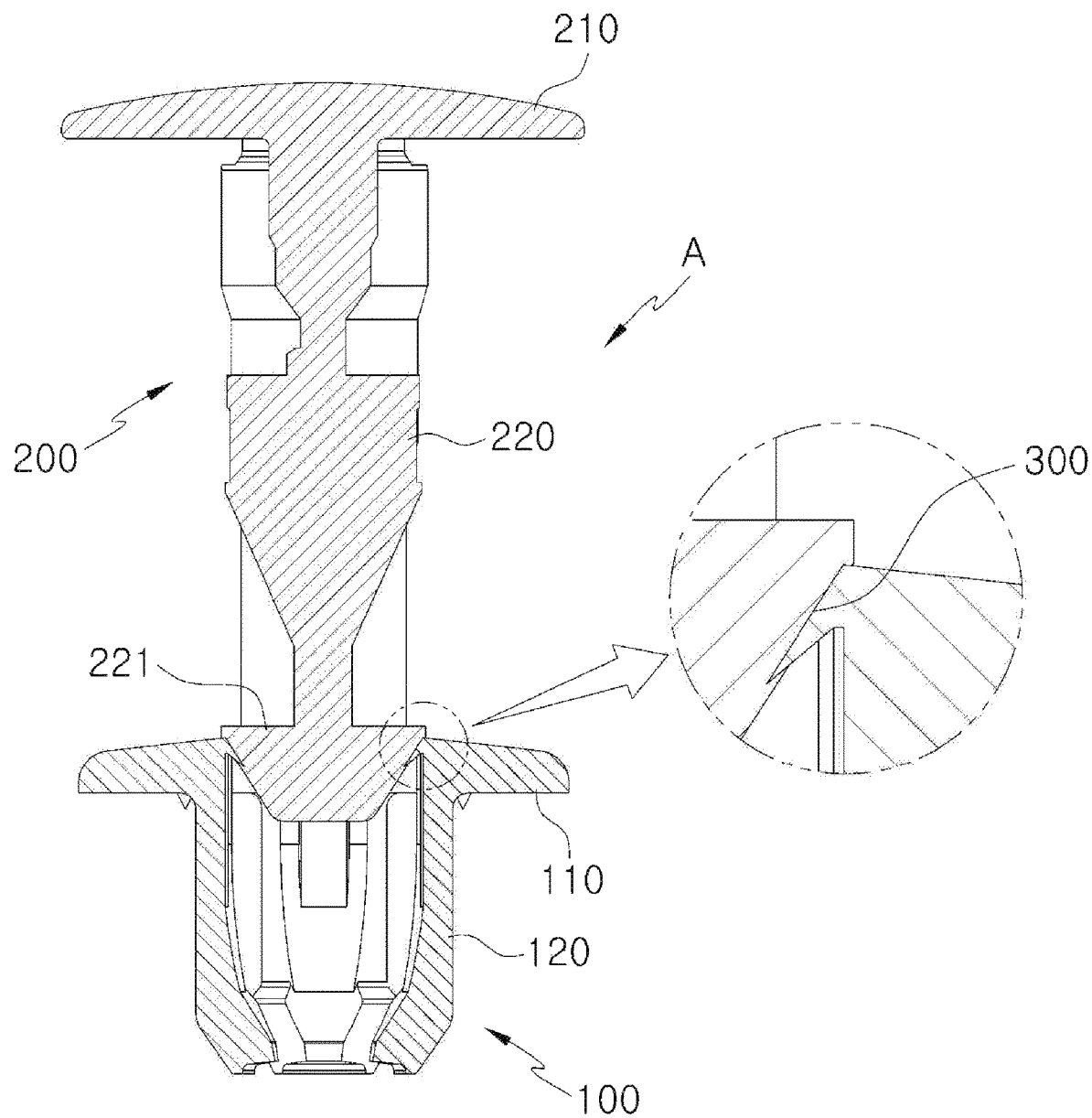
FIG. 4 is a cross-sectional view of FIG. 2.
Figure 5:
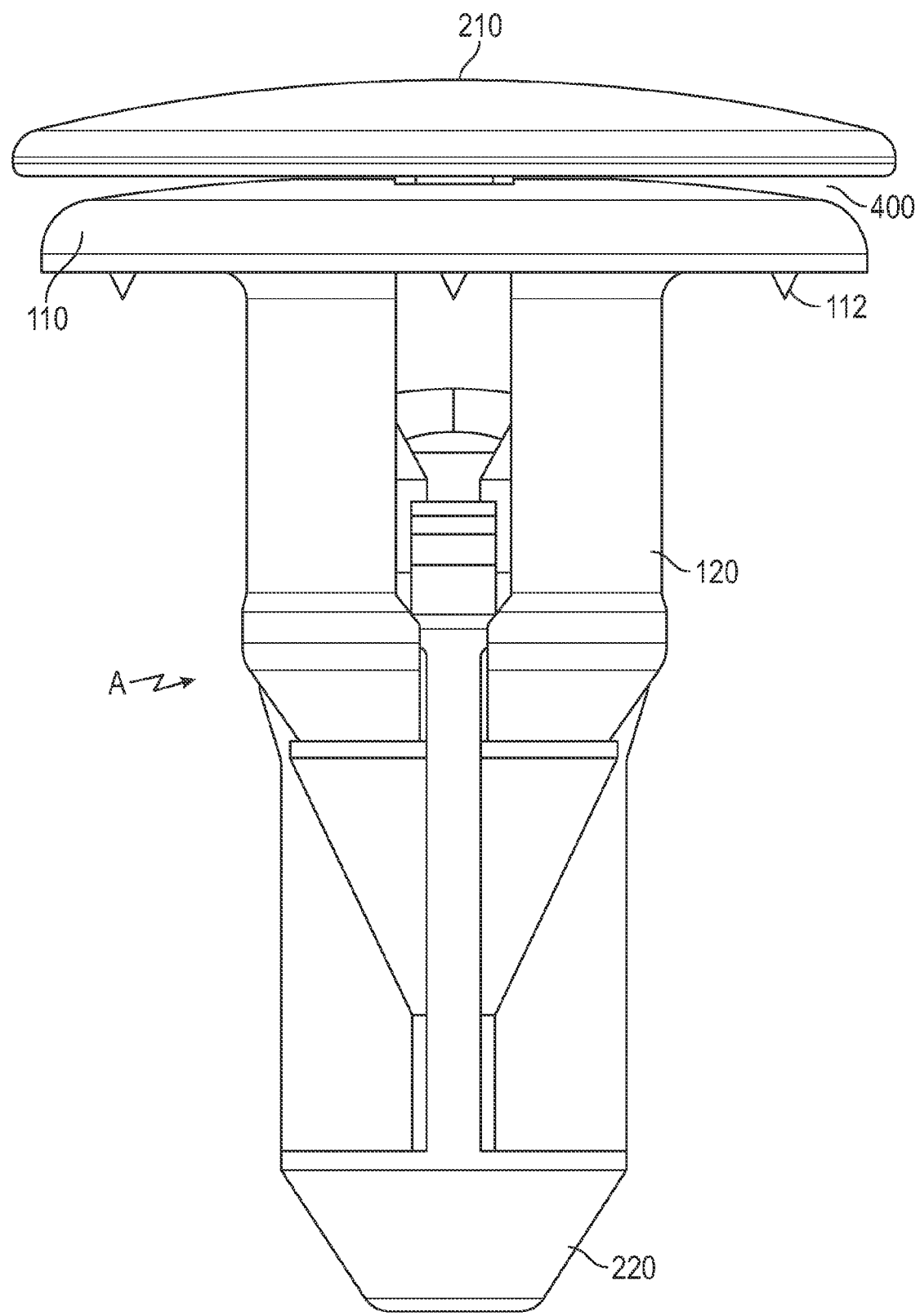
FIG. 5 is a front view illustrating a state where a fastener assembly according to the present disclosure is fastened.
Figure 6:
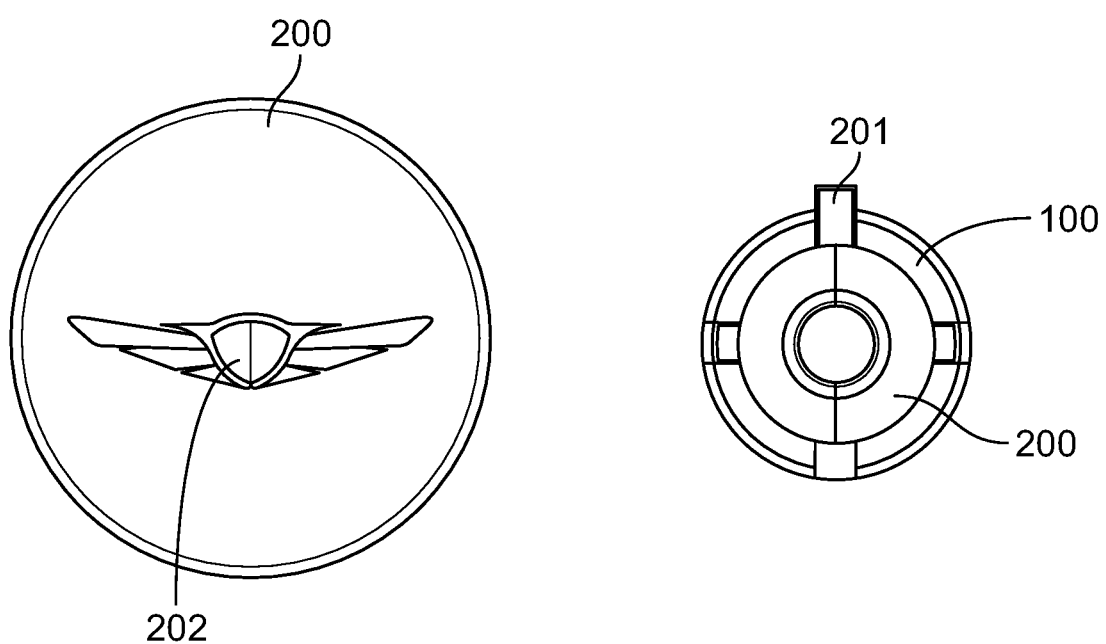
FIG. 6 is a view illustrating the bottom surface of the fastener assembly according to the present disclosure and the upper surface of the pin.

FIG. 1 is a perspective view illustrating an exploded view of a fastener assembly according to the present disclosure, FIG. 2 is a perspective view illustrating a fastener assembly according to the present disclosure, FIG. 3 is a perspective view illustrating a bottom surface of FIG. 2, FIG. 4 is a cross-sectional view of FIG. 2, and FIG. 5 is a front view illustrating a state where a fastener assembly according to the present disclosure is fastened.

As illustrated in FIGS. 1 to 5, a fastener assembly A according to the present disclosure comprises a grommet 100 including a head 110 having a through-hole 111 formed therein and at least one leg 120 extending downward from the head 110, and a pin 200 in which a shaft 220 inserted into the grommet 100 and a head 210 are combined.

First, the head 110 of the grommet 100 is formed in a shape of a circular flange, and the through-hole 111, which is a passage for the pin 200, is formed at the center thereof.

In addition, a bevelled insertion tip 221 formed at the distal end of the shaft 220 of the pin 200 is configured so as to be accommodated in the through-hole 111.

Accordingly, the pin 200 is guided down into the grommet 100, and the four legs 120 of the grommet 100 are expanded in a biased state by the shaft 220 to securely fasten the object to be fixed.

Since various constituent elements in addition to the above-described features are further included, but the normal functions are applied to the constituent elements with respect to parts which are not directly related to the present disclosure, a description thereof will be omitted.

The fastener assembly A of the present disclosure has the grommet 100 and the pin 200 integrally formed by the connection tip 300.

Accordingly, the grommet 100 and the pin 200 are integrally formed, and the object to be fixed can be fixed by a single motion of inserting the grommet 100 and the pin 200 into the object to be fixed. In other words, the grommet 100 and the pin 200 are maintained in the pre-installed state.

Specifically, the connection tip 300 is configured to be severed when a force is applied in the direction in which the pin 200 is inserted into the grommet 100.

In other words, the connection tip 300 connecting the grommet 100 and the pin 200 is severed by force pressing the pin 200 to simultaneously insert and fix the pin 200 and the grommet 100 into the object to be fixed, and thus the assembly thereof is convenient.

This is because the known fastener assembly is generally made of a synthetic resin material and the material of the connection tip 300 is also made of synthetic resin, so when the pin 200 is pressed, an external force is concentrated on the connection tip 300 and thus the elastic limit is exceeded and plastic failure due to deformation by stress occurs.

In addition, as illustrated in FIGS. 2 and 4, the connection tip 300 is formed between the through-hole 111 and the insertion tip 221 formed in the shaft 220.

Furthermore, four connection tips 300 are disposed radially at equal intervals around the through-hole 111.

In particular, the connection tip 300 is formed during injection molding of the pin 200 and the grommet 100 to maintain the pre-installed state of the fastener assembly of the present disclosure.

The diameter of the head 210 of the pin 200 is larger than the diameter of the head 110 of the grommet 100 and only the pin is exposed when assembled on the vehicle.

Meanwhile, a gap 400 is configured to be between the head 210 of the pin 200 and the head 110 of the grommet 100 even after the head 210 of the pin 200 and the head 110 of the grommet 100 are in close contact with each other.

Specifically, as illustrated in FIG. 5, the upper end of the head 110 of the grommet 100 is formed in an arc shape and the lower end of the head 210 of the pin 200 is formed to be flat and the gap 400 is formed therebetween.

Thus, a tool and hand can be introduced through the gap 400.

Lastly, a fixing protrusion 112 is provided on the lower surface of the head 110 of the grommet 100 to inhibit rotation of the grommet 100 when the grommet 100 is inserted into the object to be fixed made of fabric material.

According to the present disclosure, the pin 200 and the grommet 100 are integrally formed, and the object to be fixed can be fixed by a single motion of inserting the grommet 100 and the pin 200 into the object to be fixed.

In other words, the connection tip 300 connecting the pin 200 and the grommet 100 is severed by the force pressing the pin 200, so that the pin 200 and the grommet 100 are simultaneously inserted into and fixed to the object to be fixed, and thus the assembly thereof is convenient.

In addition, since the operation for fixing the object to be fixed is performed by a single motion of inserting the pin 200 and the grommet 100, it is possible to shorten the assembly time and reduce the manufacturing costs.

In addition, the pin 200 is prevented from becoming lost during assembly.

In addition, the diameter of the head 210 of the pin 200 is formed so as to be larger than the diameter of the head 110 of the grommet 100 so that only the head 210 of the pin 200 is exposed to the outside, and thus the marketability is improved by the esthetic enhancement.

Lastly, a key 201 is formed in the grommet 100 or the pin 200 and a key groove 10 is formed in the object to be installed into which the grommet 100 or the pin 200 is installed, and the automobile brand logo 202 or the pattern is formed on the pin 200 and configured so that the automobile logo is not rotated to improve the sense of high quality of the automobile.

According to the fastener assembly of the present disclosure, there is an advantageous effect in that the pin and the grommet are integrally formed and the object to be fixed can be fixed by a single motion of inserting the grommet and the pin into the object to be fixed.

Specifically, the connection tip connecting the pin and the grommet is severed by a force pressing the pin, and the pin and the grommet are simultaneously inserted into and fixed to the object to be fixed so that the assembly is convenient.

In other words, since the operation for fixing the object to be fixed is performed by a single motion of inserting the pin and the grommet, the assembly time can be shortened and the manufacturing costs can be reduced.

In addition, the connection tips prevent the pin from becoming lost during assembly.

Further, the diameter of the pin head is formed to be larger than the diameter of the grommet head, and only the pin head is exposed to the outside, and thus the marketability is improved by the esthetic enhancement.

In addition, it is easy to disassemble the pin by providing a gap between the pin head and the grommet head.

As described above, although the preferred embodiments of the present disclosure have been described in detail, the technical scope of the present disclosure is not limited to the above-described embodiments but should be construed according to the claims. In such a case, it will be considered by those skilled in the art that many modifications and variations are possible without departing from the scope of the present disclosure.

What is claimed is:

1. A fastener assembly comprising:
a grommet including a head having a through-hole formed therein and a plurality of legs extending downwardly from the head; and
a pin including a head and a shaft inserted into the grommet, wherein the grommet and the pin are integrally formed by a connection tip,
wherein a plurality of fixing protrusions is disposed radially on a lower surface of the head of the grommet, and
wherein the plurality of fixing protrusions extends normal to the lower surface of the head of the grommet.

2. The fastener assembly of claim 1, wherein the connection tip is severed when a force is applied in a direction in which the pin is inserted into the grommet.

3. The fastener assembly of claim 2, wherein the connection tip is formed between the through-hole, and an insertion tip is formed on the shaft.

4. The fastener assembly of claim 3, wherein four connection tips are disposed radially at equal intervals around the through-hole.

5. The fastener assembly of claim 1, wherein the connection tip is formed during injection molding of the pin and the grommet.

6. The fastener assembly of claim 1, wherein the head of the pin has a diameter equal to or greater than a diameter of the head of the grommet.

7. The fastener assembly of claim 6, wherein a gap is formed between the head of the pin and the head of the grommet when the pin is inserted into the grommet.

8. The fastener assembly of claim 7, wherein an upper end of the head of the grommet is formed into an arc shape, a lower end of the head of the pin is formed to be flat, and the gap is formed between the upper end and the lower end.

9. The fastener assembly of claim 1, wherein a key is formed on the pin, and a key groove is formed on the grommet.

10. A fastener assembly comprising:
a grommet including a plurality of legs extending from a head, the plurality of legs defining a through-hole; and
a pin including a head and a shaft extending from the head, the shaft configured to be inserted into the through-hole of the grommet,
wherein the plurality of legs includes a first leg, a second leg, a third leg, and a fourth leg that are disposed radially around the through-hole,
wherein a plurality of fixing protrusions is disposed along a lower surface of the head of the grommet and adjacent to gaps formed between the plurality of legs and around the through-hole.

\* \* \* \* \*